(12) United States Patent
Bayazit et al.

(10) Patent No.: US 7,764,858 B2
(45) Date of Patent: **\*Jul. 27, 2010**

(54) STACKABLE SPLICE CHIP DEVICE

(75) Inventors: Yilmaz Bayazit, Minneapolis, MN (US);
Mark Smrha, Burnsville, MN (US);
Oscar Bran De Leon, Belle Plaine, MN
(US); Tom Tinucci, Chaska, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/231,313

(22) Filed: Aug. 29, 2008

(65) Prior Publication Data

US 2009/0074371 A1    Mar. 19, 2009

Related U.S. Application Data

(63) Continuation of application No. 12/002,327, filed on Dec. 14, 2007, now Pat. No. 7,421,182, which is a continuation of application No. 11/212,470, filed on Aug. 25, 2005, now Pat. No. 7,310,471.

(51) Int. Cl.
*G02B 6/00* (2006.01)
*G02B 6/46* (2006.01)

(52) U.S. Cl. ................. 385/135; 385/134; 385/137
(58) Field of Classification Search .......... 385/135–138
See application file for complete search history.

(56) References Cited

U.S. PATENT DOCUMENTS

| | | | |
|---|---|---|---|
| 4,840,449 A | 6/1989 | Ghandeharizadeh | |
| 4,900,123 A | 2/1990 | Barlow et al. | |
| 5,074,635 A | 12/1991 | Justice et al. | |
| 5,115,489 A | 5/1992 | Norris | |
| 5,119,459 A | 6/1992 | Meyerhoefer et al. | |
| 5,185,845 A | 2/1993 | Jones | |
| 5,189,725 A | 2/1993 | Bensel et al. | |
| 5,222,184 A | 6/1993 | Foss | |
| 5,323,480 A | 6/1994 | Mullaney et al. | |
| 5,363,467 A | 11/1994 | Keith | |

(Continued)

FOREIGN PATENT DOCUMENTS

GB       2 367 378       3/2002

(Continued)

OTHER PUBLICATIONS

Splice Tray Kits, http://www.levitonvoicedata.com/catalog/BuildPage.aspx?BuildPageID=141, 2 pages (Copyright 2001-2004; publicly known prior to the filing date of the present application).

(Continued)

*Primary Examiner*—Michelle R Connelly Cushwa
(74) *Attorney, Agent, or Firm*—Merchant & Gould P.C.

(57) ABSTRACT

A splice tray arrangement including a tray and a splice chip arrangement. The splice chip arrangement including stackable splice chips defining channels for holding splice elements. Each of the splice chips including a mounting arrangement for mounting the splice chip at a mounting location on the tray, and a stacking arrangement for mounting the splice chip upon another splice chip.

9 Claims, 8 Drawing Sheets

U.S. PATENT DOCUMENTS

| | | | |
|---|---|---|---|
| 5,420,956 A | 5/1995 | Grugel et al. |
| 5,450,518 A | 9/1995 | Burek et al. |
| 5,490,229 A | 2/1996 | Ghandeharizadeh et al. |
| 5,519,804 A | 5/1996 | Burek et al. |
| 5,548,678 A | 8/1996 | Frost et al. |
| 5,553,183 A | 9/1996 | Bechamps |
| 5,553,186 A | 9/1996 | Allen |
| 5,572,617 A | 11/1996 | Bernhardt et al. |
| 5,577,151 A | 11/1996 | Hoffer |
| 5,590,234 A | 12/1996 | Pulido |
| 5,647,045 A | 7/1997 | Robinson et al. |
| 5,689,605 A | 11/1997 | Cobb et al. |
| 5,790,741 A | 8/1998 | Vincent et al. |
| 5,825,962 A | 10/1998 | Walters et al. |
| 5,835,657 A | 11/1998 | Suarez et al. |
| 5,870,519 A | 2/1999 | Jenkins et al. |
| 5,896,486 A | 4/1999 | Burek et al. |
| 5,917,984 A | 6/1999 | Röseler et al. |
| 6,009,225 A | 12/1999 | Ray et al. |
| 6,144,792 A | 11/2000 | Kim et al. |
| 6,192,180 B1 | 2/2001 | Kim et al. |
| 6,215,938 B1 | 4/2001 | Reitmeier et al. |
| 6,226,436 B1 | 5/2001 | Daoud et al. |
| 6,249,636 B1 | 6/2001 | Daoud |
| 6,259,851 B1 | 7/2001 | Daoud |
| 6,285,815 B1 | 9/2001 | Daoud |
| 6,353,697 B1 | 3/2002 | Daoud |
| 6,427,045 B1 | 7/2002 | Matthes et al. |
| 6,456,772 B1 | 9/2002 | Daoud |
| 6,504,989 B1 | 1/2003 | Gooding |
| 6,512,876 B2 | 1/2003 | Daoud |
| 6,567,601 B2 | 5/2003 | Daoud et al. |
| 6,580,866 B2 | 6/2003 | Dauod et al. |
| 6,687,450 B1 | 2/2004 | Kempeneers et al. |
| 6,701,056 B2 | 3/2004 | Burek et al. |
| 6,788,871 B2 | 9/2004 | Taylor |
| 6,798,966 B2 | 9/2004 | Loh |
| 6,801,704 B1 | 10/2004 | Daoud et al. |
| 6,845,207 B2 | 1/2005 | Schray |
| 7,310,471 B2 | 12/2007 | Bayazit et al. |
| 7,421,182 B2 * | 9/2008 | Bayazit et al. ............ 385/135 |
| 7,463,810 B2 * | 12/2008 | Bayazit et al. ............ 385/135 |
| 2002/0118944 A1 | 8/2002 | Burns et al. |
| 2002/0159745 A1 | 10/2002 | Howell et al. |
| 2003/0091315 A1 | 5/2003 | Allerellie |
| 2004/0240825 A1 | 12/2004 | Daoud et al. |

FOREIGN PATENT DOCUMENTS

| | | |
|---|---|---|
| GB | 2 367 379 | 4/2002 |
| WO | WO 2007/039585 A1 | 4/2007 |

OTHER PUBLICATIONS

Preformed Line Products. Splice Closures—Splice Cases, http://www.newtechindustries.com/newtech/preformed_line_products/splice_closures.htm, 3 pages (Jan. 27, 2005; publicly known prior to the filing date of the present application).

3M FibrDome Closure Instructions, pp. 1-36 (Aug. 1995).

Splice-through Fiber Trays, http://www.hubersuhner.com/products/hs-p-fo/hs-p-fo-inst/hs-p-fo-inst-lisa/hs-p-fo-inst-, 1 page (publicly known prior to the filing date of the present application).

Photo of splice tray and cover, and photo of opened splice tray, manufactured by 3M of St. Paul, Minnesota, 2 pages (publicly known prior to Aug. 25, 2005.).

Photo of splice tray manufactured by ADC Telecommunications, Inc. of Eden Prairie, Minnesota, 1 page (publicly known prior to Aug. 25, 2005.).

Photo of splice tray manufactured by Preformed Line Products of Cleveland, Ohio, 1 page (publicly known prior to Aug. 25, 2005.).

Patching Splitter Tray, http://splitter.telecomosp.com/fiberl.cfm?Polybrands=fibcon-fibmanage-copnid-KR-310, 4 pages (publicly known prior to Aug. 25, 2005.).

Fiber Optics Fiber Apparatus Closures Accessories Trays, http://www.arrisistore.com/subcat.php?cat=EBACA&PHPSESSID=0a6023c3ce561b7d9, 8 pages (publicly known prior to Aug. 25, 2005.).

Splice Trays. A LANscape® Solutions Product. Corning Cable Systems, 6 pages (publicly known prior to Aug. 25, 2005.).

* cited by examiner

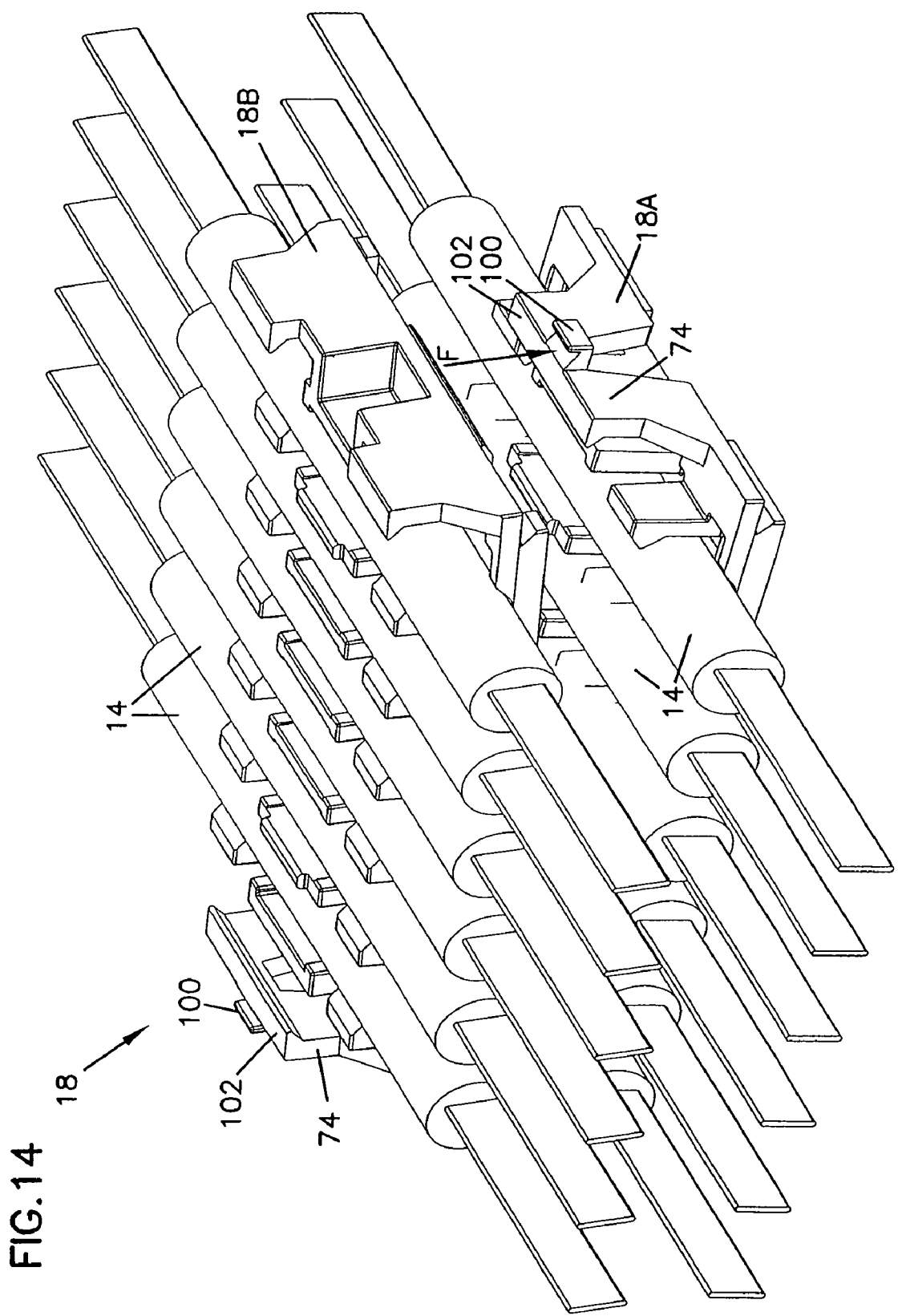

STACKABLE SPLICE CHIP DEVICE

CROSS-REFERENCE TO RELATED APPLICATIONS

This application is a continuation of U.S. application Ser. No. 12/002,327, filed Dec. 14, 2007 now U.S. Pat. No. 7,421,182; which is a continuation of U.S. application Ser. No. 11/212,470, filed Aug. 25, 2005, now U.S. Pat. No. 7,310,471; which applications are incorporated herein by reference.

TECHNICAL FIELD

This disclosure relates generally to devices used in the telecommunications industry. More particularly, this disclosure relates to a splice chip arrangement for use in holding fiber optic splice elements.

BACKGROUND

A wide variety of telecommunication applications utilize fiber optic cables, and in turn involve fiber optic cable splicing and fiber optic cable storage. In these applications, a splice tray is often used to store spliced fiber optic cables. The splice trays commonly include a splice chip for holding or retaining the splice elements of the cables.

In general, improvement has been sought with respect to conventional splice tray arrangements, generally to better accommodate ease of use, and to increase the density of splice elements that can be stored and managed by the splice tray arrangement.

SUMMARY

The present disclosure relates to a splice chip having a mounting arrangement for securing the splice chip to a splice tray. The mounting arrangement also permits the splice chip to be secured to a second splice chip in a stacked relationship. The stacked configuration of the splice chips increases the splice element density within the splice tray, without reducing storage capacity.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 14 is a perspective view of the first and second splice chips of FIG. 7, shown with splice elements.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
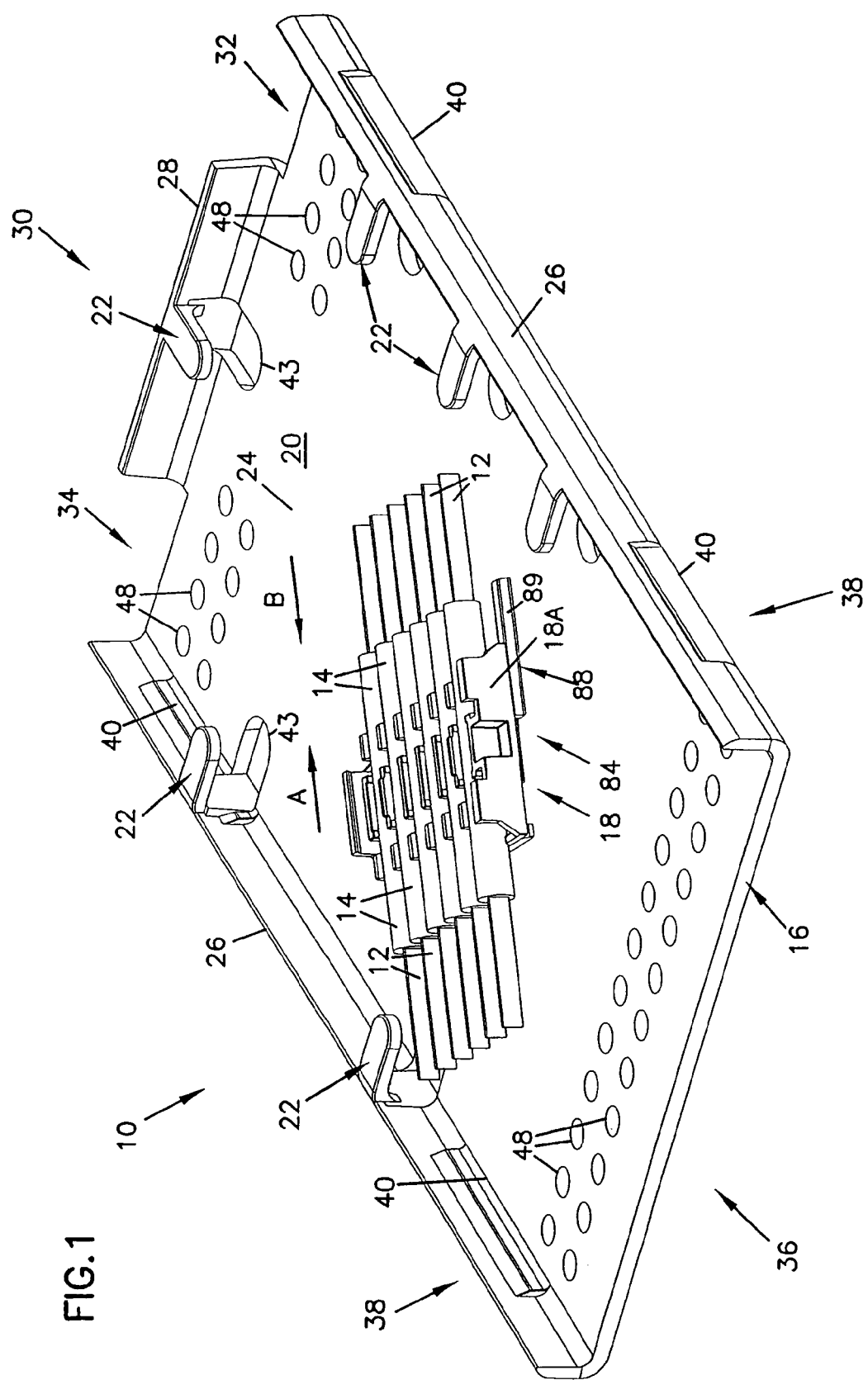
FIG. 1 is a perspective view of one embodiment of a splice tray arrangement, including an embodiment of a first splice chip, according to the principles of the present disclosure.
Figure 2:
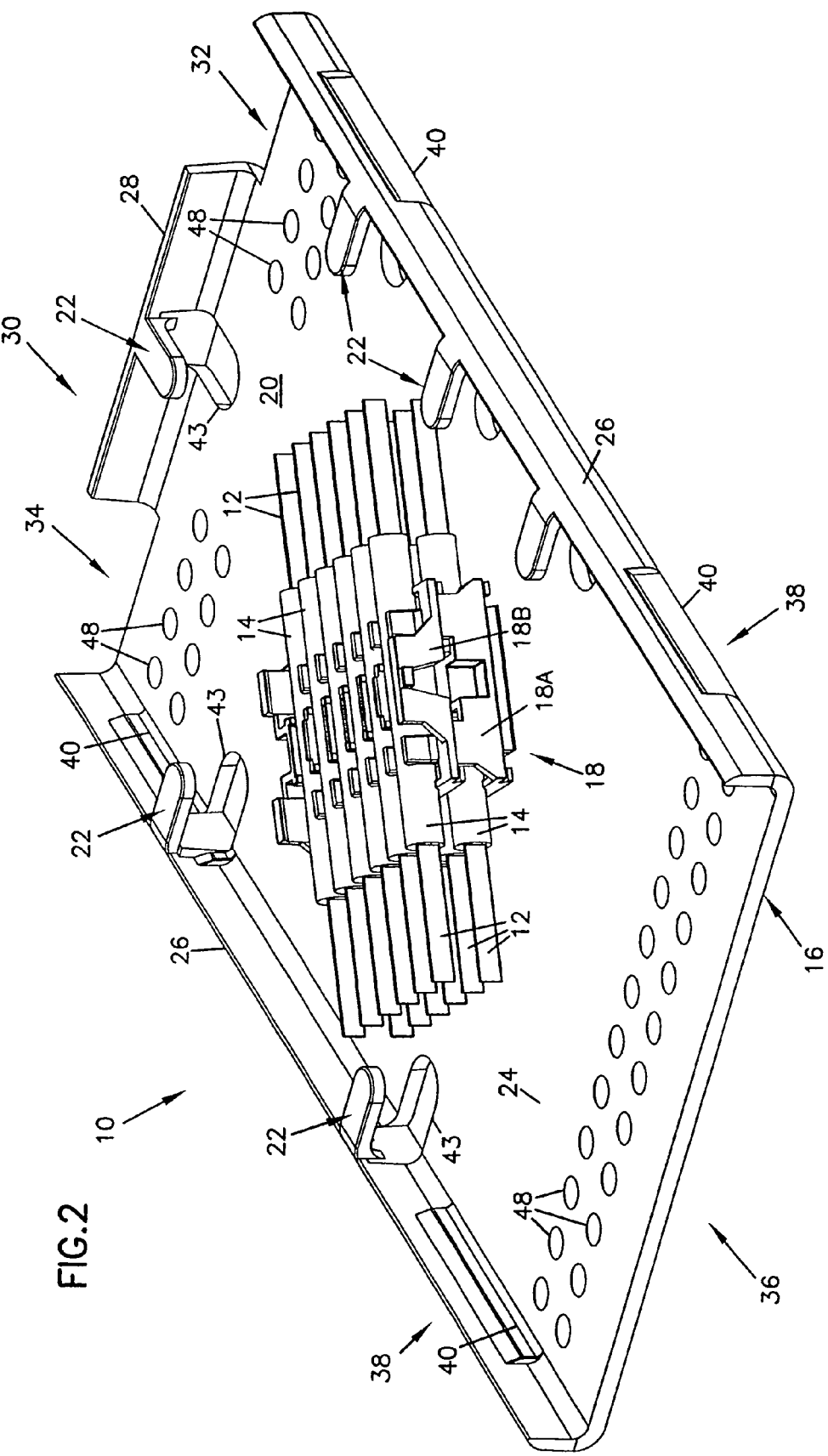
FIG. 2 is a perspective view of the splice tray arrangement of FIG. 1, including a second splice chip.

FIGS. 1 and 2 illustrate an embodiment of a splice tray arrangement 10 having features that are examples of how inventive aspects in accordance with the principles of the present disclosure may be practiced. One of the preferred features relates to increasing the splice element density of the splice tray arrangement without reducing storage capacity.

As shown in FIGS. 1 and 2, the splice tray arrangement 10 is used to house spliced fiber optic cables 12. In splicing fiber optic cables, two fiber optic cables are joined or spliced together by a splice element 14. The illustrated splice element 14 is a cylindrical, mass fusion splice element used to join multiple optic fibers of a ribbon cable. In accordance with the principles disclosed, the splice tray arrangement can be constructed and sized for use with other types of splice elements, such as stranded heat shrink splice elements used to join single-fiber cables, for example.

The splice tray arrangement 10 of the present disclosure generally includes a base or tray 16 and a splice chip arrangement 18 for holding or retaining the splice elements 14. Often, in use, a generous portion of slack cable is provided to permit maintenance or replacement of the splice elements 14 without requiring complete cable replacement. The slack cable is stored within an interior storage region 20 of the tray 16. Cable management components 22, such as tabs, are located within the storage region 20 for retaining and managing the slack cable.

I. Tray

Referring still to FIG. 1, the tray 16 of the splice tray arrangement 10 includes a generally planar bottom surface 24. Tray sides extend upward from or perpendicular to the bottom surface 24. In the illustrated embodiment, the tray sides include two opposing tray sides 26 and a tray side 28 transverse to the two opposing tray sides 26. The transverse tray side 28 is centrally located at a first end 30 of the tray 16. First and second cable access openings 32, 34 are located at opposite corners of the first end 30 of the tray 16 adjacent to the transverse tray side 28. The first and second cable access openings 32, 34 each function as a cable entry and/or a cable exit. A second end 36 of the tray 16 is an open end. The second open end 36 also functions as a cable entry and/or a cable exit of the splice tray arrangement 10.

In use, the fiber optic cables 12 can enter and exit through any of the first open end 36, the first cable access opening 32, and the second cable access opening 34 of the tray 16. To manage the organization of cables entering and exiting the tray 16, the cables can be fixed at a particular entering and exiting location on the tray 16. In particular, apertures 48 are provided adjacent to the first open end 36 and the first and second cable access openings 32, 34 of the tray 16. A tie or other securing device (not shown) placed through the aperture (s) 48 can be used to tie or secure the cable 12 at the particular entering and exiting location.

The cable management components 22 (e.g. tabs) of the splice tray arrangement 10 are formed along each of the sides 26, 28 of the tray 16. The tabs 22 retain cables within the interior storage region 20 of the tray 16. In the illustrated embodiment, slots 43 are formed in the bottom surface 24 of the tray 16 opposite each of the tabs 22 for manufacturing purposes.

The splice tray arrangement 10 can further include a cover (not shown). The tray 16 includes cover attachment structure 38 constructed to receive mating structure of the cover for securing the cover to the tray. In the illustrated embodiment, the cover attachment structure 38 includes openings 40 formed in at least one of the opposing sides 26 of the tray 16. In an alternative embodiment, the cover attachment structure 38 can be formed in the transverse side 28 of the splice tray 16.

The tray 16 of the splice tray arrangement 10 is preferably a molded construction. The tray 16 can be molded from common engineering materials including common engineering polymers such as polybutylene terephthalate (PBT), polycarbonate (PC), polyethylene ether (PPE), and polystyrene (PS), for example.

II. Splice Chip Arrangement

Figure 3:
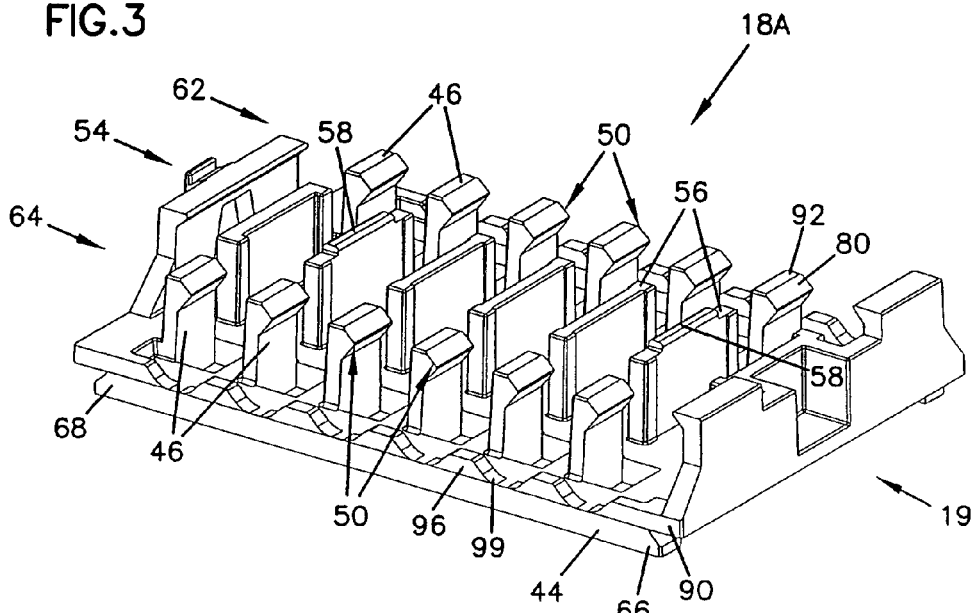
FIG. 3 is a side perspective view of one of the first and second splice chips of FIGS. 1 and 2.
Figure 4:
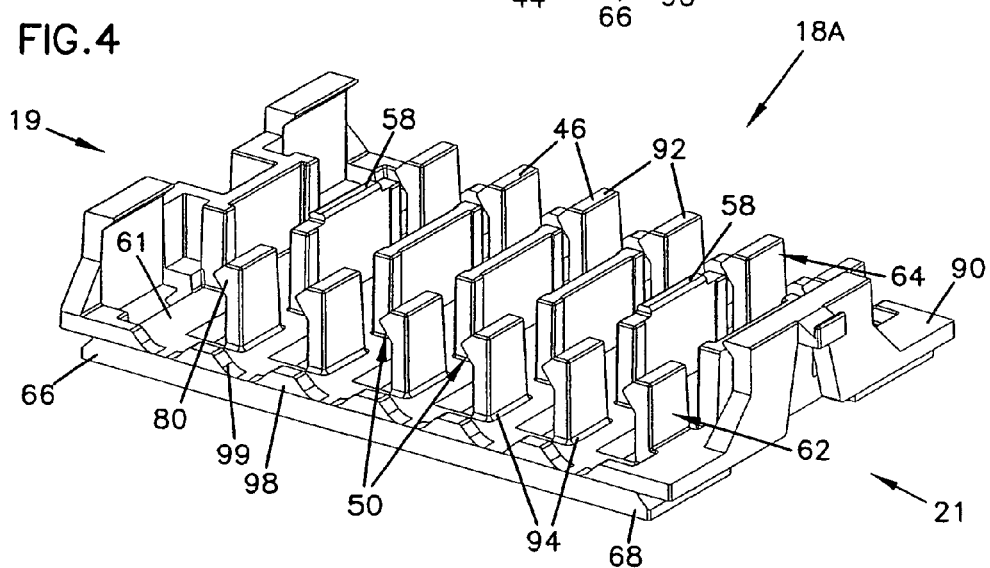
FIG. 4 is an opposite side perspective view of the splice chip of FIG. 3.
Figure 5:
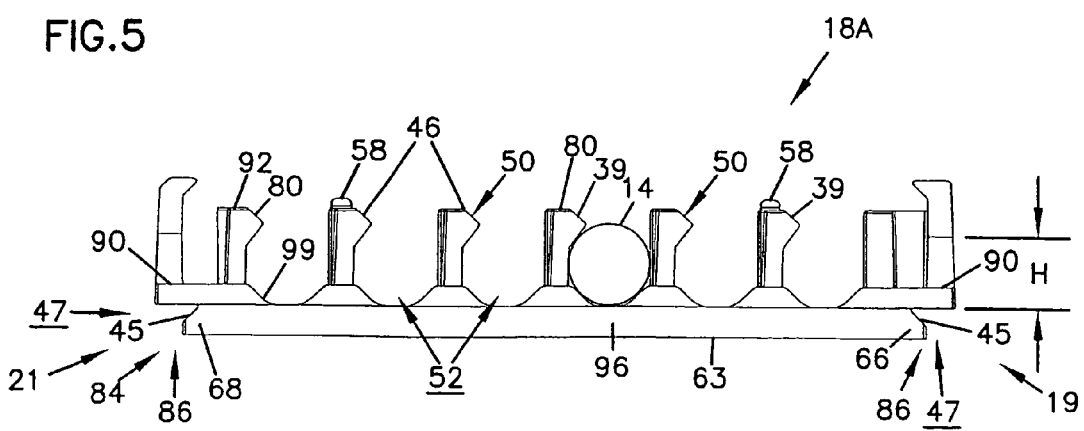
FIG. 5 is side elevation view of the splice chip of FIG. 3.

The splice chip arrangement 18 of the present disclosure preferably includes at least a first splice chip 18A having a stackable configuration. The stackable configuration permits multiple splice chips (e.g., 18A and 18B shown in FIG. 2) to be stacked upon one another to increase splice element density of the splice tray arrangement 10, without reducing storage capacity. FIGS. 3-5 illustrate one of the splice chips (e.g., 18A) of the splice tray arrangement 10. Generally, the splice chips 18A, 18B shown in FIG. 2 are identical in construction; accordingly, the principles and constructions described with respect to the first splice chip 18A shown in FIGS. 3-5 also apply to the second splice chip 18B.

The splice chip 18A generally includes a base 44 and a plurality of arms 46. The base 44 has a top side 61 (FIG. 4) and a bottom side 63 (FIG. 5). The plurality of arms 46 extends or projects upward from the top side 61 of the base 44. Each of the arms 46 has a free end 92 (FIG. 4) and an opposite end 94 formed integral with the base 44. The arms 46 define slots or channels 52 (FIG. 5) within which the splice elements 14 are placed and held. As shown in FIG. 5, each of the channels 52 runs parallel to one another. In the illustrated embodiment, the splice chip 18A includes six parallel channels 52.

Referring to FIGS. 3 and 4, the arms 46 of the splice chip 18A are arranged in first and second rows of arms 62, 64. A row 54 of dividers 56 is located between the first and second rows of arms 62, 64. The channels 52 of the splice chip 18A are each partially defined by at least one arm 46 and one divider 54. As shown in FIG. 5, the channels 52 have a height H defined by the arms 46. In the illustrated embodiment, the height H is at least about 0.160 inches to accommodate receipt of a splice element 14 having a diameter of similar dimension.

As shown in FIGS. 3-5, the splice chip 18A preferably includes retaining structure 50 for retaining the splice elements 14 within the channels 52. In the illustrated embodiment, the retaining structure 50 includes tabs or heads 80 located at the free ends 92 of the arms 46. The heads 80 are constructed and arranged to snap-fit the splice elements 14 securely within the channels 52. When placed in the channel 52, the splice element 14 rests upon first and second side edges 96, 98 (FIGS. 3 and 4) of the base 44. In the illustrated embodiments, the side edges 96, 98 include detents or cut-outs 99 that cradle the splice elements 14.

As can be understood, preferably the arms 46 of the splice chip 18A are flexible to provide the snap-fit retaining feature previously described. The flexible construction of the arms 46 can be provided by either or both of the choice of manufacturing material, or the dimensional construction of the arms. Materials that can be used to manufacture at least the arms 46 of the splice chip 18A, include common engineering polymers such as polybutylene terephthalate (PBT), polycarbonate (PC), polyethylene ether (PPE), and polystyrene (PS), for example.

In use, a splice element 14 is inserted into one of the channels 52 by pressing the splice element 14 downward upon top ramped surfaces 39 (FIG. 5) of the heads 80 of the associated arms 46. The downward force flexes the arms 46 outward to accept the splice element 14. The splice element 14 is retained within the channel 52 by the heads 80 of the arms 46. In contrast to the flexible construction of the arms 46, the dividers 56 of the splice chip 18A can be made of a more rigid construction. The dividers 56, for example, do not include retaining structure (e.g. 50) and therefore are not required to flex or function as a snap-fit retainer.

III. Mounting Arrangement

Referring back to FIG. 1, the splice chip 18A of the present disclosure typically mounts to the bottom surface 24 of the tray 16. The splice tray arrangement 10 includes a mounting arrangement 84 that detachably secures the splice chip 18A to the tray 16 without the use of adhesive or additional fasteners. The mounting arrangement 84 includes interlocking, longitudinal guides 86 (FIG. 5), 88 (FIG. 1) disposed on each of the splice chip 18A and the tray 16.

Referring back to FIGS. 3-5, the longitudinal guides 86 of the splice chip 18A includes an integrally formed lip or ledge 90 located at first and second opposite ends 19, 21 of the splice chip 18A. The ledges 90 extend laterally outward beyond ends 66, 68 of the base 44, and are offset or spaced a distance from the bottom side 63 of the base 44. The base 44 includes an angled portion 45 (FIG. 5) at each of the ends 66, 68 adjacent to the guides 86. An interlocking space 47 is provided between each of the guides 86 and the angled portions 45 of the base 44 at the ends 19, 21 of the splice chip 18A.

Figure 13:
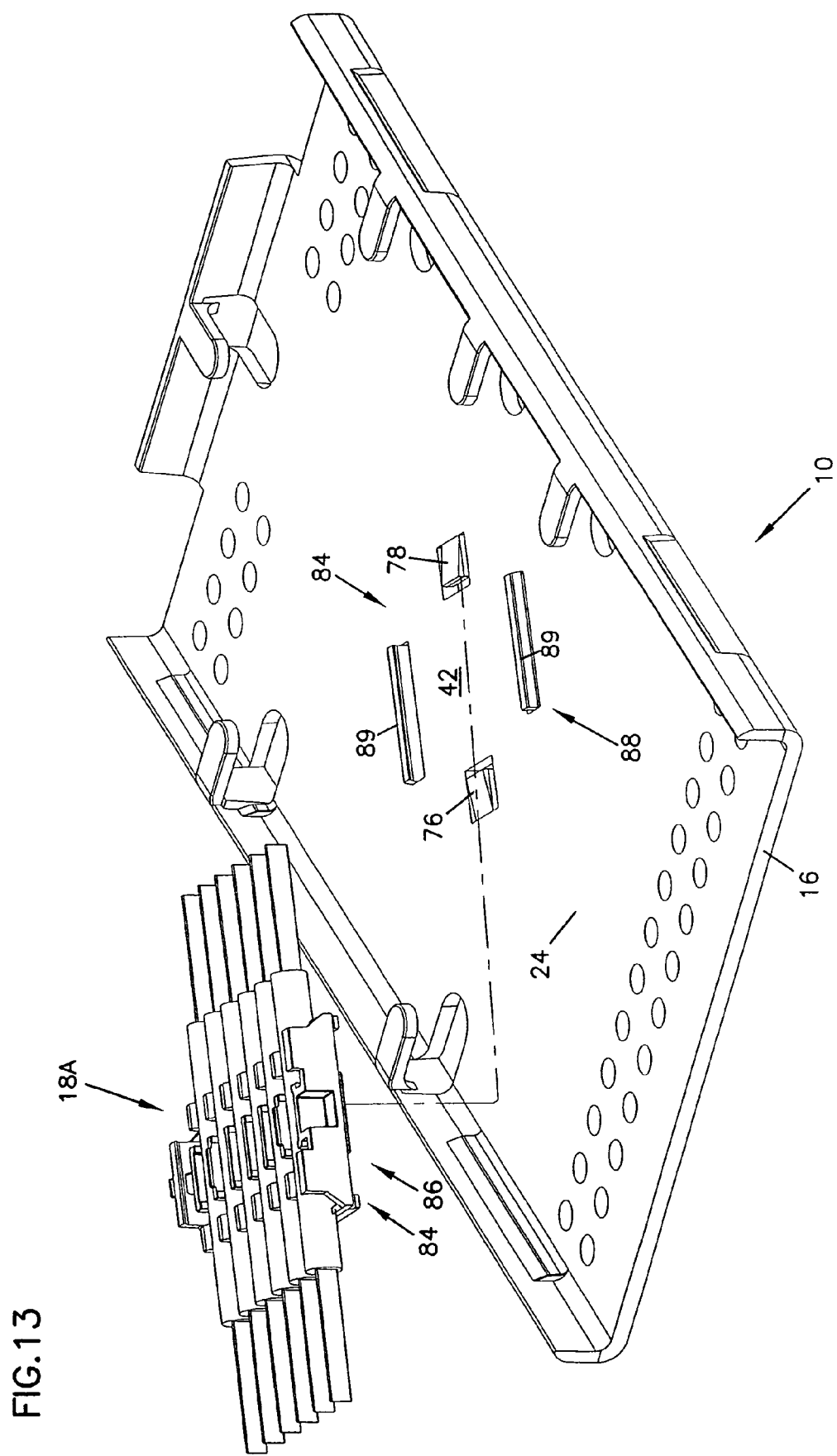
FIG. 13 is a perspective view of the splice tray arrangement of FIG. 1, showing placement of the first splice chip.

Referring now to FIG. 13, the longitudinal guides 88 of the tray 16 includes ribs or tracks 89 that project outward from the bottom surface 24 of the tray. In the illustrated embodiment, the tracks 89 are integrally formed in the bottom surface 24 of the tray 16. The tracks 89 have a cross-sectional configuration corresponding to the interlocking space 47 provided by the splice chip 18A. The inverse, cross-sectional configuration of the tracks 89 slide within the interlocking spaces 47 of the splice chip 18A to secure the splice chip 18A to the bottom surface 24 of the tray 16.

When securing the splice chip 18A to the tray 16, the splice chip 18A slides in a lateral direction A, as shown in FIG. 1, such that the interlocking guides 86, 88 of the mounting arrangement 84 engage one another. In the alternative, the splice chip 18A can be secured to the tray 16 by sliding the splice chip 18A in an opposite lateral direction B. When the interlocking guides 86, 88 of the mounting arrangement 84 are engaged, the splice chip 18A is prevented from movement in a direction transverse to the bottom surface 24 of the tray.

Referring now to FIGS. 6-10, the splice chip arrangement 18 is preferably constructed to accommodate an increased density of splice elements 14 (FIG. 2) without reducing storage capacity within the splice tray arrangement 10. The splice chips 18A, 18B are thereby stackable. That is, the splice chips 18A, 18B are constructed to stack on top of one another at a particular splice chip mounting location 42 (FIG. 13) of the tray 16. As shown in FIG. 13, the splice chip mounting location 42 is generally defined between the tracks 89 of the mounting arrangement 84.

Figure 6:
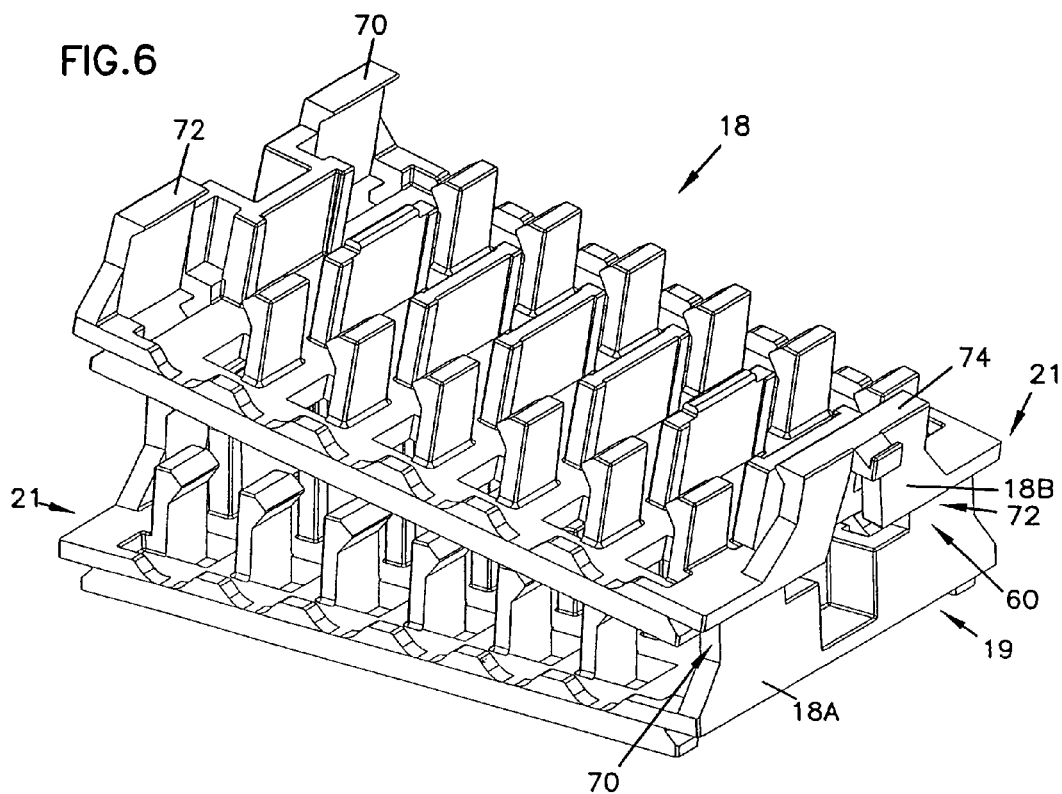
FIG. 6 is a side perspective view of the first and second splice chips of FIG. 2.
Figure 7:
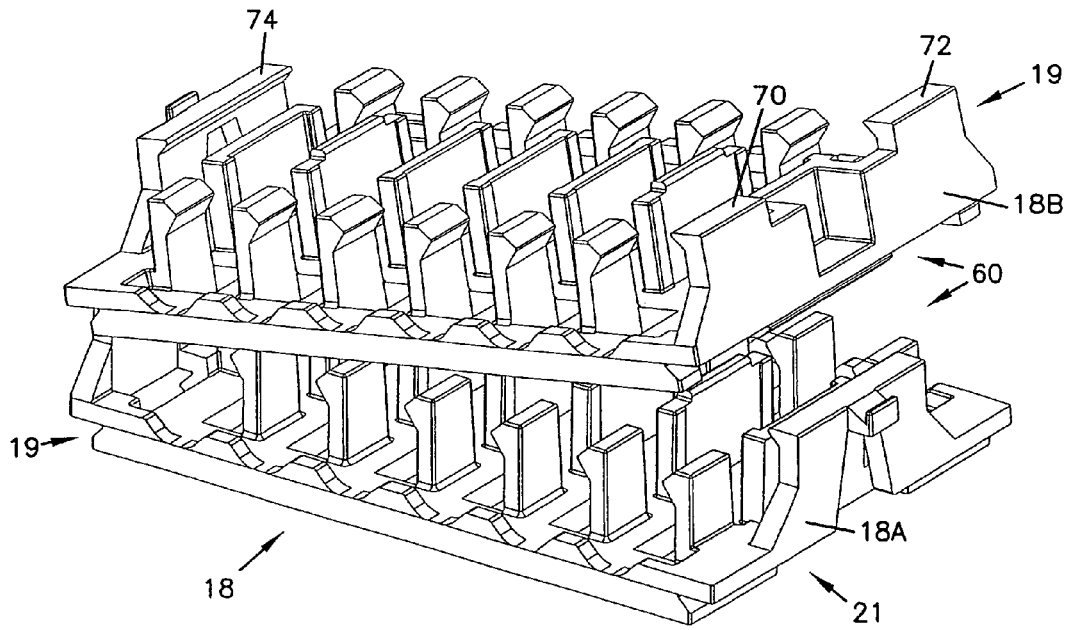
FIG. 7 is an opposite side perspective view of the first and second splice chips of FIG. 6.

Referring to FIGS. 6 and 7, each of the splice chips 18A, 18B includes a snap-fit stacking arrangement 60 that detachably secures the splice chips in relation to one another. In the illustrated embodiment, the splice chips 18A, 18B are stacked on top of one another. While referred to as being stacked on top of one another, it will be appreciated that the splice chips 18A, 18B need not be limited to a vertically stacked arrangement. Rather, the phrase "stacked on top of one another" is used for explanatory purposes of the illustrated embodiment. The splice chips may be stacked in a front-to-back arrangement depending upon the orientation of the tray, for example.

Preferably, the stacking arrangement 60 of the splice chips 18A, 18B is configured to function interchangeably with the mounting arrangement 84 of the splice tray arrangement 10. That is, the stacking arrangement 60 includes the interlocking guides 86 of the mounting arrangement 84 so that both the stacking arrangement 60 and the mounting arrangement 84 function to mount the splice chip to another splice chip, and to mount the splice chip to the tray 16. By this, the splice chips 18A, 18B are interchangeable and need not be dedicated as only a stackable chip or tray-mounted chip.

Still referring to FIGS. 6 and 7, the stacking arrangement 60 of each of the splice chips 18A, 18B further includes first and second latch members 70, 72 located at the first end 19 of the splice chip 18A, 18B, and a third latch member 74 located at the second opposite end 21 of the splice chip. The latch members 70, 72, 74 of each of the splice chips are configured to engage or latch into the interlocking spaces 47 of another splice chip.

Figure 10:
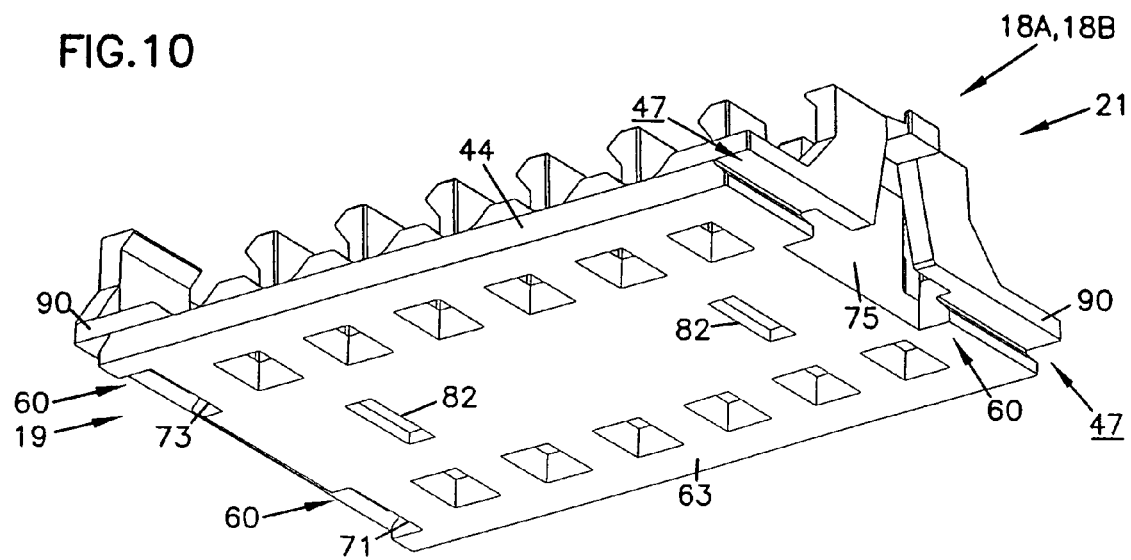
FIG. 10 is a bottom perspective view of the splice chip of FIG. 4.

Referring now to FIG. 10, first, second, and third slots 71, 73, 75 are formed in the ends 66, 68 of the base 44 for purposes of manufacturing. The slots 71, 73, 75 defined segments of interlocking spaces 47 that correspond to the arrangement of latch members 70, 72, 74. The stacked splice chips 18A, 18B are accordingly stacked in an alternating manner to accommodate the arrangement of slots and latch members. That is, opposite ends (e.g., 19 and 21) of the first and second splice chips 18A, 18B are constructed to interlock with one another. In the alternative, the ends 66, 68 of the base 44 can be manufactured without slots, thereby permitting same ends (e.g. 19 and 19) of the first and second splice chips to interlock.

Figure 8:
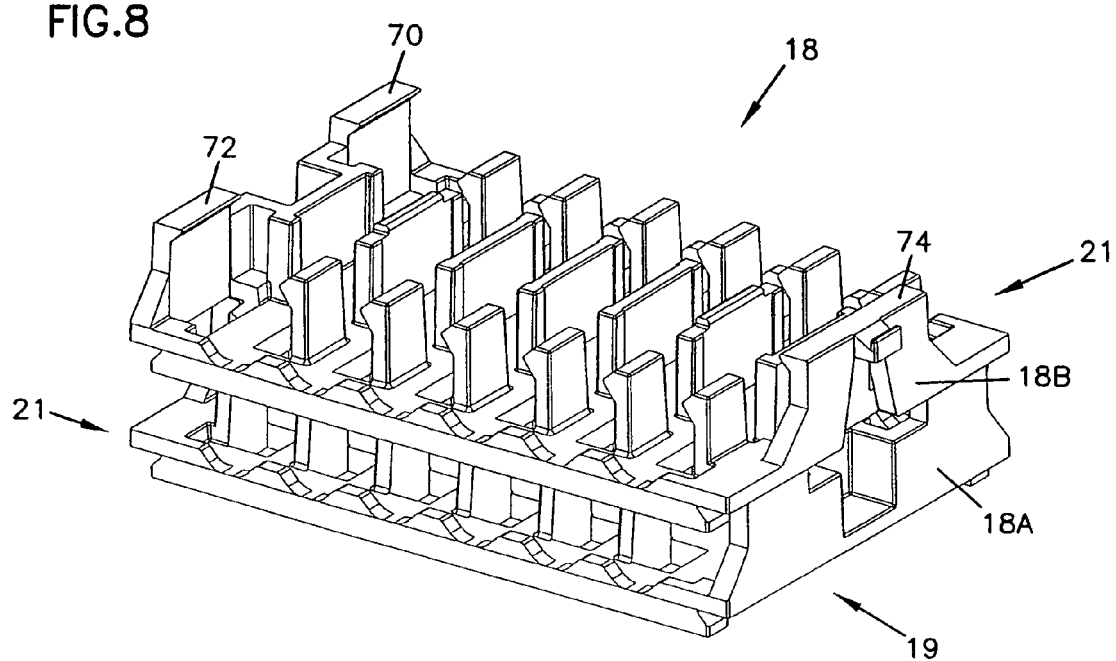
FIG. 8 is another side perspective view of the first and second splice chips of FIG. 6.
Figure 9:
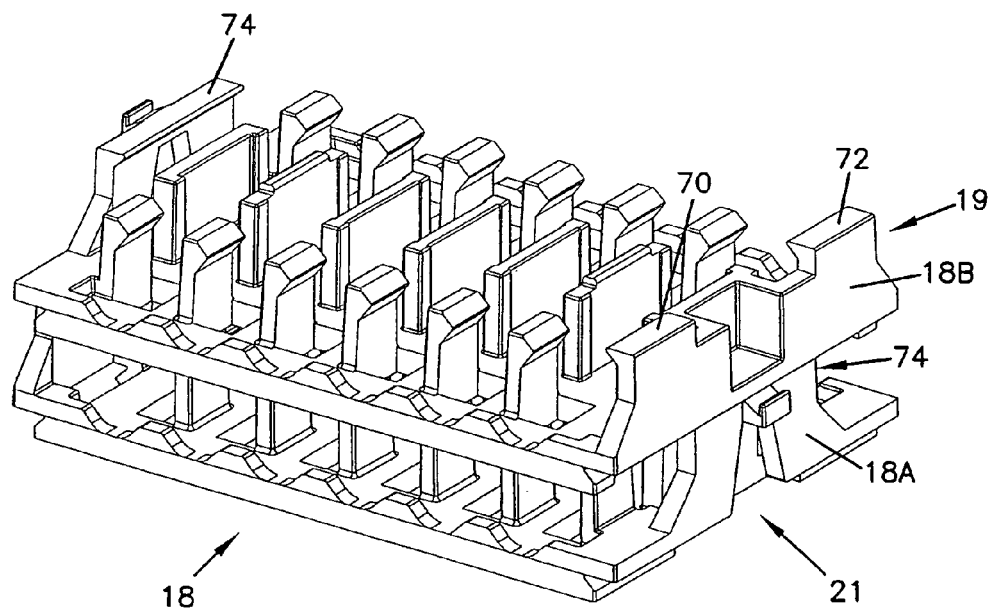
FIG. 9 is an opposite side perspective view of the first and second splice chips of FIG. 8.
Figure 11:
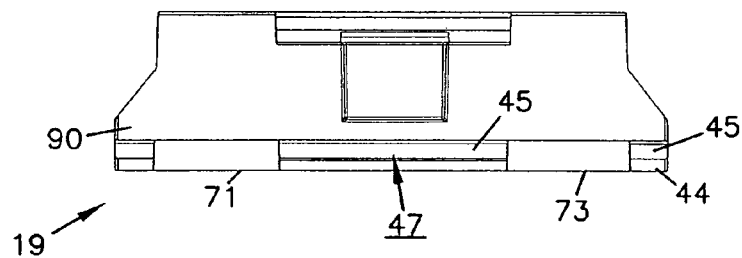
FIG. 11 is an end elevation view of the splice chip of FIG. 5.
Figure 12:
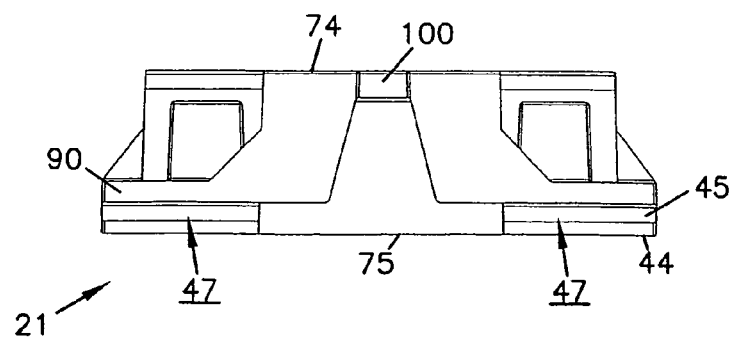
FIG. 12 is an opposite end elevation view of the splice chip of FIG. 11.

As shown in FIGS. 6 and 7, to assemble the splice chips 18A, 18B in a stacked relationship, the first and second latch members 70, 72 at the first end 19 of the bottom splice chip 18A are positioned within the interlocking spaces 47 (FIGS. 10 and 12) provided at the second end 21 of the top splice chip 18B. Referring now to FIGS. 8 and 9, the top splice chip 18B is then pivoted such that the third latch member 74 at the second end 21 of the bottom splice chip 18A snap fits into the interlocking space 47 (FIG. 11) provided at the first end 19 of the top splice chip 18B. In the alternative, the third latch member 74 of the bottom splice chip 18A can initially be engaged within the interlocking space provided on the top splice chip 18B, and then the first and second latch members snap fit into the associate interlocking spaces 47 at the other end of the top splice chip 18B.

As can be understood, preferably at least one of the third latch member 74, and the first and second latch members 70, 72 of the stacking arrangement 60 is flexible to provide the snap-fit retaining feature described. The flexible construction of the latch member(s) can be provided by either or both of the choice of manufacturing material and the dimensional construction of the latch member(s).

Referring again to FIG. 10, the bottom side 63 of the base 44 includes at least a first recess 82. The recess 82 is sized to receive a guide 58 (FIG. 3) disposed on top of one of the dividers 56 of the splice chip 18A, 18B. In the illustrated embodiment, two guides 58 (FIG. 3) and recesses 82 are provided on the splice chips 18A, 18B. The guides 58 and recesses 82 are arranged to assist in properly locating or aligning the top splice chip 18B in relation to the bottom splice chip 18A. The guides 58 and recesses 82 further assist in preventing lateral movement of the top splice chip 18B relative to the bottom splice chip 18A when secured in the stacked relationship.

In use, to assembly of the splice tray arrangement 10, the first splice chip 18A is attached to the bottom surface 24 of the tray 16. In particular, the first splice chip 18A slides in the lateral direction A (FIG. 1) so that the interlocking guides 86, 88 of the splice chip 18A and tray 16 engage. Flexible securing tabs 76, 78 (FIG. 13) are provided to prevent the splice chip 18A from inadvertent lateral movement beyond the chip mounting location 42. Further detail of a similar mounting arrangement having flexible securing tabs is described in application Ser. No. 11/212,492; the disclosure of which is incorporated herein by reference.

When the first splice chip 18A is secured to the tray 16, splice elements 14 can then be placed into the channels 52 of the splice chip. After placing the desired number of splice elements 14 within the channels 52 first splice chip 18A, the second splice chip 18B can be stacked upon the first splice chip 18A. The second splice chip 18B is attached to the first splice chip 18A in the manner previously described. Additional splice elements 14 can then be placed and secured within the channels 52 of the second splice chip 18B. In the alternative, the splice elements 14 can be placed within the channels 52 of the splice chips 18A, 18B prior to securing the chips to either the tray 16 or one another. As shown in FIG. 14, a total of twelve splice elements 14 can be held by the illustrated splice chip arrangement 18.

Referring now to FIG. 14, each of the splice chips 18A, 18B includes a release tab 100 for detaching the top splice chip (e.g., 18B) from the stack of splice chips. The release tab 100 is located adjacent to a top edge 102 of the third latch member 74. When a downward or outward pulling force F is applied to the tab 100 of the lower splice chip 18A, the latch member 74 of the lower splice chip 18A flexes outward and thereby disengages from the interlocking space 47 of the top splice chip 18B. The top splice chip 18B can then be removed from the stack by pivoting the splice chip 18B upward and disengaging the splice chip from the first and second latch members 70, 72 of the bottom splice chip 18A. The bottom splice chip 18A can be removed from the tray 16, by pressing one of the flexible securing tabs 76, 78 flush with the bottom surface 24 of the tray 16, and laterally sliding the chip 18A such that the interlocking guides 86, 88 of the splice chip and tray disengage.

The overall arrangement and construction of the disclosed splice tray arrangement 10 enhances cable management by providing a splice chip arrangement that is easy to use and increases splice element density. The above specification provides a complete description of the invention. Since many embodiments of the invention can be made without departing from the spirit and scope of the invention, certain aspects of the invention reside in the claims hereinafter appended.

What is claimed is:

1. A method of mounting splice chips to a splice tray, the method comprising the steps of:
   a) providing at least two splice chips, each splice chip including a base having opposite interlockable ends and a latch member, each one of the two splice chips being capable of directly securing to the splice tray and being capable of directly securing to the other of the two splice chips in a stacked relationship;
   b) securing a selected first one of the two splice chips directly to the splice tray, including positioning the interlockable ends of the first one splice chip within corresponding guides of the splice tray; and
   c) securing the second other of the two splice chips to the first one splice chip, including snap-fitting one of the interlockable ends of the second other splice chip to the latch member of the first one splice chip.

2. The method of claim 1, wherein each splice chip further includes a release member, and wherein each one of the two splice chips can be detached from the other of the two splice chips when secured in a stacked relationship by flexing the release member.

3. The method of claim 1, wherein the interlockable ends of the base are defined by ledges that are spaced a distance from a bottom surface of the base.

4. The method of claim 1, wherein each splice chip includes a projecting guide and a recess formed in the base, and further including aligning the recess of the second other splice chip to receive the projecting guide of the first one splice chip prior to securing the second other splice chip to the first one splice chip.

5. The method of claim 1, wherein the step of positioning the interlockable ends of the first one splice chip within the corresponding guides of the splice tray include sliding the interlockable ends of the first one splice chip within the corresponding guides of the splice tray.

6. The method of claim 5, wherein the step of sliding the interlockable ends of the first one splice chip within the corresponding guides of the splice tray includes flexing one of first and second tabs provided on the splice tray by contact between the sliding first one splice chip and the one tab.

7. The method of claim 6, further including contacting the other of the first and second tabs, wherein upon contacting the other tab, the one tab returns to an unflexed position such that the first one splice chip is captured between the first and second tabs.

8. The method of claim 7, wherein the step of sliding the interlockable ends of the first one splice chip within the corresponding guides of the splice tray includes flexing only one of the first and second tabs provided on the splice tray.

9. The method of claim 1, wherein each of the splice chips includes a corresponding interlockable member, and wherein the step of securing the second other splice chip to the first one splice chip includes pivoting the other of the interlockable ends of the second other splice chip relative to the corresponding interlockable member of the first one splice chip prior to snap-fitting the one interlockable end to the latch member.

* * * * *